United States Patent
Lee et al.

(10) Patent No.: US 10,160,445 B2
(45) Date of Patent: Dec. 25, 2018

(54) SHIFT CONTROL METHOD FOR HYBRID ELECTRIC VEHICLE

(71) Applicants: HYUNDAI MOTOR COMPANY, Seoul (KR); KIA MOTORS CORPORATION, Seoul (KR)

(72) Inventors: Chan Ho Lee, Seoul (KR); Jeong Soo Eo, Hwaseong-si (KR); Jae Sung Bang, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 28 days.

(21) Appl. No.: 15/609,945

(22) Filed: May 31, 2017

(65) Prior Publication Data
US 2018/0141539 A1 May 24, 2018

(30) Foreign Application Priority Data

Nov. 22, 2016 (KR) .................. 10-2016-0155419

(51) Int. Cl.
| | |
|---|---|
| *B60W 20/15* | (2016.01) |
| *B60W 10/04* | (2006.01) |
| *B60W 10/10* | (2012.01) |
| *B60W 10/02* | (2006.01) |

(52) U.S. Cl.
CPC ............ *B60W 20/15* (2016.01); *B60W 10/02* (2013.01); *B60W 10/04* (2013.01); *B60W 10/10* (2013.01); *B60W 2510/0241* (2013.01); *B60W 2510/1005* (2013.01); *B60W 2510/105* (2013.01); *B60W 2510/1015* (2013.01); *B60W 2510/1045* (2013.01); *B60W 2710/021* (2013.01); *B60W 2710/027* (2013.01); *B60W 2710/1005* (2013.01); *B60W 2710/1011* (2013.01); *B60W 2710/1022* (2013.01); *B60W 2710/1044* (2013.01); *B60Y 2200/92* (2013.01); *Y10S 903/93* (2013.01); *Y10S 903/945* (2013.01); *Y10S 903/946* (2013.01)

(58) Field of Classification Search
CPC ...... B60W 20/15; B60W 10/02; B60W 10/04; Y10S 903/93
USPC ........................................................ 701/22
See application file for complete search history.

(56) References Cited

U.S. PATENT DOCUMENTS

| | | | |
|---|---|---|---|
| 2003/0027683 A1* | 2/2003 | Grillenberger | B60W 10/02 477/70 |
| 2015/0166039 A1* | 6/2015 | Cho | F16H 61/0437 701/54 |

FOREIGN PATENT DOCUMENTS

| | | |
|---|---|---|
| JP | 11-37272 A | 2/1992 |
| JP | 2008045676 A | 2/2008 |
| KR | 10-2015-0134501 A | 12/2015 |
| KR | 10-1673814 B1 | 11/2016 |

* cited by examiner

*Primary Examiner* — Isaac G Smith
(74) *Attorney, Agent, or Firm* — Brinks Gilson & Lione

(57) ABSTRACT

The present disclosure provides a shift control method for a hybrid electric vehicle including: controlling a speed of a vehicle driving source; simultaneously controlling a release element and a connection element in a transmission based on a rotation acceleration of a transmission output shaft when shifting by a power-on down shift.

11 Claims, 7 Drawing Sheets

SHIFT CONTROL METHOD FOR HYBRID ELECTRIC VEHICLE

CROSS-REFERENCE TO RELATED APPLICATION

The present application claims priority to and the benefit of Korean Patent Application No. 10-2016-0155419 filed on Nov. 22, 2016, which is incorporated herein by reference in its entirety.

FIELD

The present disclosure relates to a shift control method for a hybrid electric vehicle, more particularly, to a shift control method for a hybrid electric vehicle capable of shortening a shift time, reducing the deterioration in acceleration feeling, and improving shift feeling and fuel efficiency.

BACKGROUND

The statements in this section merely provide background information related to the present disclosure and may not constitute prior art.

A hybrid vehicle (Hybrid Electric Vehicle, HEV) uses two or more different driving sources and typically includes an engine providing driving torque by combusting fuel and a motor driven by power of a battery to provide driving torque.

A hybrid controller (Hybrid Control Unit, HCU) as a high controller that controls the entire operation of the vehicle and various controllers for controlling various devices of the vehicle may be mounted on the hybrid vehicle.

For example, the hybrid vehicle may be provided with an engine controller (Engine Control Unit, ECU) for controlling the operation of an engine; a motor controller (Motor Control Unit, MCU) for controlling the operation of a motor; a transmission controller (Transmission Control Unit, TCU) for controlling the operation of a transmission; a battery controller (Battery Management System, BMS) for collecting battery state information and using it to control battery charge and discharge or provide it to other controllers and performing control to manage the battery; and a brake controller for performing control of vehicle braking, and so on.

The hybrid controller and each controller communicate with each other via CAN communication and perform cooperation control with respect to various devices in the vehicle, and the high controller collects a variety of information from a low controller to transmit control command to the low controller.

Meanwhile, since TMED hybrid system using an automatic transmission (AT) or DCT may control the speed of each power source, improving the shift control method may provide a better shift feeling and faster shift times.

Shortened shift times can reduce power delivery loss, reduce the hydraulic pump load in a system using hydraulic pressure during shifting, and keep the torque step (torque differences in stepped changes in torque) small at the end of the shift, thereby improving fuel efficiency.

SUMMARY

In one aspect, the present disclosure provides an improved shift control method for a hybrid electric vehicle having advantages of reducing a shifting time, reducing deterioration of acceleration feeling, improving a sense of shift, and enhancing fuel efficiency when shifting by a power-on down shift depending on driver's an accelerator pedal control.

In one form of the present disclosure, a shift control method for a hybrid electric vehicle may include: step a) of when a shift demand for a power-on down shift is detected, a controller starts a release control of a clutch which is a release element mounted in a transmission and determines whether slip of the release element is generated from a rotation speed of a transmission input shaft; step b) of when determining slip generation, the controller starts a feedback control of the release element in the transmission based on information about a torque of a transmission output shaft or a rotation acceleration of the transmission output shaft, and simultaneously controls a speed of a vehicle driving source so as to increase a speed of the transmission input shaft; a step c) of when the speed of the transmission input shaft reaches 'synchronous speed+predetermined value', the controller controls a speed of the vehicle driving source such that the speed of the transmission input shaft follows 'synchronous speed+predetermined value', and simultaneously, increases a rotation acceleration of the transmission output shaft by performing a feedback control of a connection element in the transmission based on a rotation acceleration of the transmission output shaft; step d) of preparing a synchronization that a transmission input torque being inputted through the vehicle driving source is maintained and a clutch torque of the connection element in the transmission is increased; and step e) of completing a shift after determining synchronization.

In some forms of the present disclosure, the shift control method may reduce a shifting time, minimize deterioration of acceleration feeling, improve a sense of shift, and enhance fuel efficiency when shifting by a power-on down shift by a speed control of a vehicle driving source and a simultaneous cooperation control of a release element and a connection element in a transmission.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
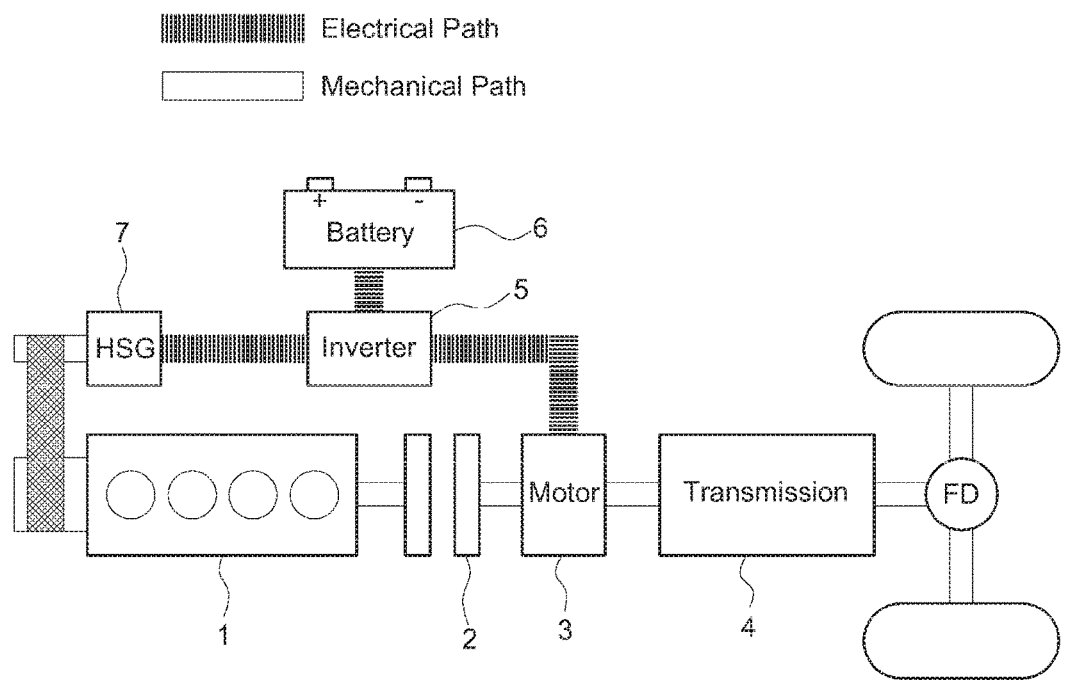
FIG. 1 is a drawing schematically illustrating a configuration of a power train of a hybrid vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a shift control method for a hybrid electric vehicle having advantages of reducing a shifting time, reducing deterioration of acceleration feeling, improving a sense of shift, and enhancing fuel efficiency when shifting by a power-on down shift depending on driver's an accelerator pedal control.

For this, the present disclosure discloses a shift control method for a hybrid electric vehicle capable of improving a sense of shift and fuel efficiency and reducing a shifting time by a speed control of a vehicle driving source and a simultaneous cooperation control of a release element and a connection element which are mounted in a transmission when shifting by a power-on down shift.

The following described shift control process may be applied to a shift control process which is performed in a case that there is a shift demand for a power-on down shift by a driver's accelerator pedal control in both an EV mode and an HEV mode irrespective of a drive mode, that is, the EV mode and the HEV mode in a hybrid vehicle in which a stepped transmission such as an automatic transmission (AT) is mounted.

In this regard, the power-on down shift means a shift of changing a shift stage (gear stage) of a transmission to a low stage for gaining a high torque in a vehicle in a case that there is a driver's acceleration intention, that is, a driver's accelerator pedal control.

In addition, a shift control process according to the present disclosure may be realized by performing a cooperation control of a plurality of controllers such as a hybrid controller (HCU), a transmission controller (TCU), a motor controller (MCU), and an engine controller (ECU), and may be also realized by one controller having integrated function of the controllers.

For better understanding about the present disclosure, a shift control method for a power-on down shift of a hybrid vehicle according to a conventional art will be described.

Figure 2:
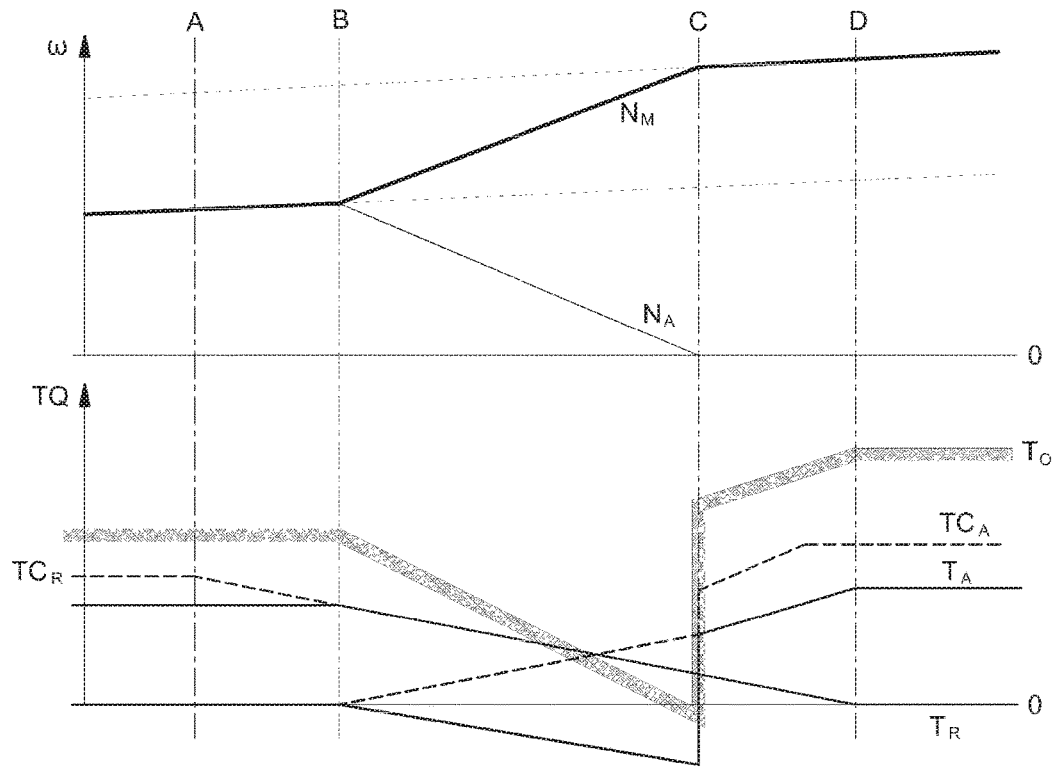
FIG. 2 is a view showing an example of a power-on down shift control of a hybrid vehicle in which an automatic transmission is mounted according to the prior art.

FIG. 2 shows an example of a power-on down shift control of a hybrid vehicle in which an automatic transmission is mounted, and a vertical axis indicates speed (ω) and torque (TQ) when shifting for a power-on down shift and a horizontal axis indicates time when shifting for a power-on down shift.

Firstly, the controller (TCU) detects a shift demand for a power-on down shift from current vehicle drive information.

That is, if a driver operates an accelerator pedal, the controller determines whether to start a shift control for a power-on down shift depending on shift pattern from an accelerator pedal value detected by an accelerator pedal detection unit and a current drive vehicle speed detected by a vehicle speed detection unit.

For instance, a shift control process for a power-on down shift is started by determining that a shift demand for a power-on down shift is desired when the accelerator pedal value is bigger than a reference value corresponding to a current vehicle speed depending on the shift pattern.

In this regard, the accelerator pedal detection unit may be a sensor which detects a state of the accelerator pedal and then outputs an electrical signal according to the state, and for example, may be an APS (Accelerator Pedal Sensor) for a general hybrid vehicle, and the controller determines a power-on down shift from an accelerator pedal position or an accelerator pedal operation displacement corresponding to a value of the APS.

As described above, if a power-on down shift is determined, a shift control is started at a time point A of FIG. 2, and at this time, the controller reduces a clutch torque ($TC_R$) of the release element in the transmission such that a clutch is released.

In a state of in-gear, slip is generated when a clutch torque ($TC_R$) of the release element is to be smaller than a transfer torque ($T_R$) of the release element.

And then, a speed change section is entered at a time point B, the time point B is a time point when an increase of a rotation speed ($N_M$) of a transmission input shaft by slip of the release element is detected.

When an increase of a rotation speed ($N_M$) of the transmission input shaft is detected, the controller reduces a clutch torque ($TC_R$) of the release element at the time point B and increases a clutch torque ($TC_A$) of the connection element.

Figure 3:
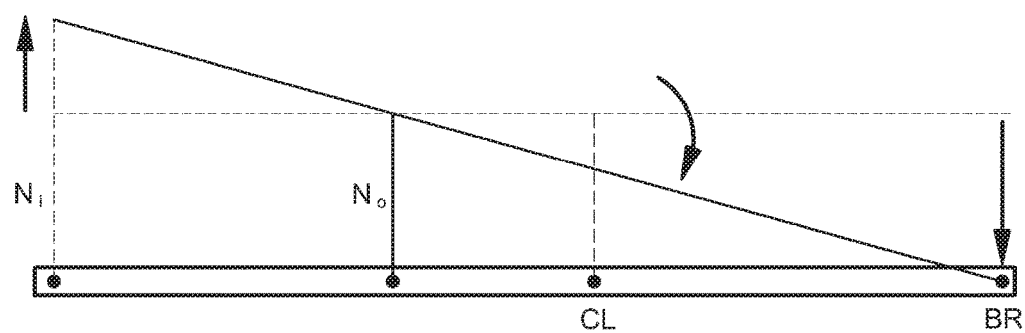
FIG. 3 is a view showing an example of speed change of a connection element when down shifting by a lever line illustration according to the prior art.

When down shifting, a brake (BR), which is the connection element of the transmission, is engaged toward a direction to reduce a speed, and if a down shift is generated in a state that two elements positioned on the left side in FIG. 3, that is, an input shaft and an output shaft of the transmission are fixed to a lever ($N_i$: input shaft speed, $N_o$: output shaft speed) and a vehicle is driven so that the lever is to be horizontal as a clutch (CL), which is the release element, is engaged, the clutch (CL) is released and the brake (BR) is combined and thus a speed ($N_i$) of the input shaft is increased and a speed of brake (BR) is reduced to be 0.

If γ is a constant value which is determined depending on a gear ratio, a torque ($T_o$) of the output shaft of the transmission is obtained using the following formula.

$$T_o = \gamma(TC_R - TC_A) \text{ (Herein, } \gamma > 0, TC_A \geq 0, TC_R \geq 0\text{)}$$

Accordingly, a torque ($T_o$) of the transmission output shaft is to be decreased as a clutch torque ($TC_A$) of the connection element is to be increased, thereby generating a sense of deceleration.

Therefore, there are many cases of performing a feedback control on a speed ($N_i$) of the transmission input shaft as the release element by minimizing a clutch torque ($TC_A$) of the connection element.

Next, a synchronization section where synchronization is realized is started from a time point C, and the controller (TCU) completes the shift by increasing a clutch torque ($TC_A$) of the connection element and decreasing a clutch torque ($TC_R$) of the release element by entering the synchronization section at the time point C when determining synchronization (example, when '|transmission input shaft speed ($N_i$)–synchronous speed|<reference value' is satisfied continuously for a predetermined time).

At this time, a clutch torque ($TC_A$) of the connection element is increased to a level of the time of completing the shift for preventing release during synchronization.

If $T_i$ is a transmission input shaft torque (=transmission input torque) and $i_t$ is a gear ratio of a target shift stage, a transmission output shaft torque (=transmission output torque) ($T_o$) is obtained using the following formula.

$$T_o = i_t(T_i - TC_R) \text{ (Herein, } i_t > 0, TC_R \geq 0)$$

This means that a transmission output shaft torque ($T_o$), which is determined by only a clutch torque ($TC_A$) of the connection element and a clutch torque ($TC_R$) of the release element before the time point C, surely generates a torque step difference due to the influence by a transmission input shaft torque ($T_i$) after the time point C.

In addition, it means that a transmission output shaft torque ($T_o$) is to be decreased by an effect of interlocking as a clutch torque ($TC_R$) of the release element is to be increased.

As the clutch torque (TCA) of the connection element before the time point C is to be increased, a torque step difference is to be largely increased at the time point C since the direction of a transfer torque is opposite, and accordingly there are many cases of decreasing a level of the torque step difference by decreasing a transmission input shaft torque ($T_i$) at the time point C.

A time point D represents the time of completing the shift, and it is determined that the shift is completed in a case that a clutch torque ($TC_A$) of the connection element is a maximum value (MAX. value), and simultaneously, a clutch torque ($TC_R$) of the release element is 0 as at the time point D or in a case that a set time passes after the time point C.

At the time point D of completing the shift, the controller (TCU) ends the all clutch control of the transmission.

However, according to the well-known power-on down shift control method as described above, as the clutch control is performed depending on a predetermined demand torque input, a sense of deceleration is generated in the sections B-C in case that a clutch torque ($TC_A$) of the connection element is largely applied for reducing a speed change section.

In addition, a transmission output shaft torque ($T_o$) is decreased if a clutch torque ($TC_R$) of the release element is decreased for reducing a speed change section, thereby generating deterioration of a sense of acceleration in the sections B-C.

Further, deterioration of fuel efficiency occurs as a torque reduction is performed by using an engine under a condition of limiting motor charge for reducing a torque step difference upon synchronization, and a torque step difference control is difficult on synchronization and thus there are limitations in terms of improving shift feeling as a clutch torque cannot be recognized exactly.

For solving this problem, in the present disclosure, a transmission input speed is maintained to be bigger than a synchronous speed such that a clutch torque of connection element does not decrease a transmission output shaft torque by performing a speed control of a vehicle driving source when a transmission input speed is increased on shifting for a power-on down shift, and at this time, a sense of acceleration during shifting is maintained by performing control on the release element and the connection element in the transmission based on a vehicle acceleration (being related with a transmission output shaft rotation acceleration), and shift feeling is ensured, a shift time is shortened, and vehicle fuel efficiency is improved by minimizing a torque step difference before and after combination.

Hereinafter, a shift control method for a power-on down shift of a hybrid vehicle according to an exemplary embodiment of the present disclosure will be described referring to FIG. 4 to FIG. 8.

Figure 4:
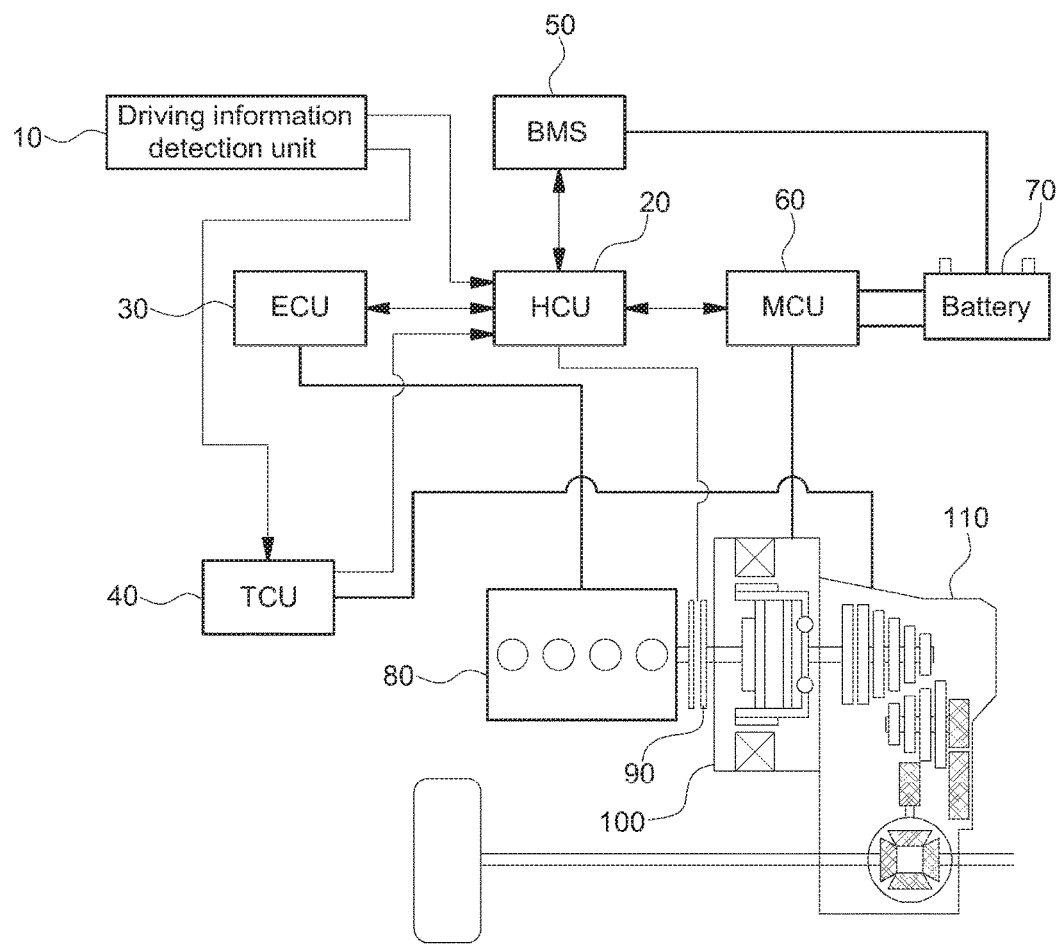
FIG. 4 is a schematic diagram of a system of a hybrid vehicle.

FIG. 4 is a schematic diagram of a system of a hybrid vehicle which is applied to the present disclosure, and a hybrid vehicle includes an engine 80 and a motor 100 which are driving sources for vehicle driving, an engine clutch 90 interposed between the engine 80 and the motor 100, a transmission 110 connected with an output side of the motor 100, a motor controller (MCU) 60 having an inverter for driving and controlling the motor 100, and a battery 70 connected with the motor 100 as a electric power source of the motor 100 to be charged or discharged through the inverter in the motor controller (MCU) 60.

In FIG. 4, a reference numeral 10, which is a driving information detection unit, may include an accelerator pedal detection unit and a vehicle speed detection unit, and may be connected with a hybrid controller (HCU) 20 or a transmission controller (TCU) 40, which is the highest controller, so as to input a detection value.

The engine clutch 90 performs an engagement operation (close) or a release operation (open) by a hydraulic pressure so that the engine 80 and the motor 100 are connected to each other to transmit or cut off power between them, and the inverter in the motor controller (MCU) 60 transforms DC current of the battery 70 to 3 phase AC current and then supplies the current to the motor 100 for driving the motor 100.

In addition, the transmission 110 shifts power of the motor 100 or composite power of the engine 80 and the motor 100 so as to transfer the shifted power to driving wheels through a drive shaft, and an automatic transmission (Automatic Transmission, AT) or a DCT (Double Clutch Transmission) may be used as the transmission.

In addition, the hybrid controller (HCU) 20, which is a high controller to control the overall operation of a vehicle, is mounted in a hybrid vehicle, and besides, various controllers are provided for controlling various devices.

For instance, an engine controller (ECU) 30 controlling operation of the engine, a motor controller (MCU) 60 controlling operation of the motor 100, a transmission controller (TCU) 40 controlling operation of the transmission 110, and a battery controller (BMS) 50 collecting information of the battery state so as to use for control to charge or discharge the battery 70 or provide the information to another controller and performing a control on the battery 70.

The hybrid controller and other controllers transmit and receive information to/from each other through CAN (Controller Area Network) so as to perform a cooperation control on device in a vehicle, and a high controller collects a variety of information from low controllers and transmits control command to the low controllers.

Figure 5:
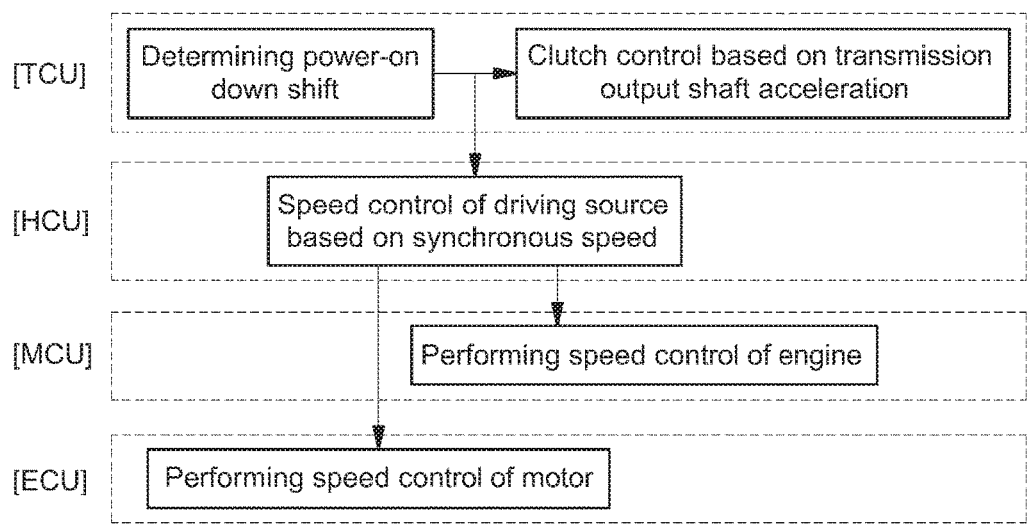
FIG. 5 is a block diagram showing main functions which are performed by respective controllers in a plurality of vehicles.

FIG. 5 is a block diagram showing main functions which are performed by the respective controllers in vehicles according to the forms of the present disclosure, and the controllers will be described in detail. The transmission controller (TCU) 40 determines whether there is a shift demand for a power-on down shift by vehicle driving information detected from the driving information detection unit 10 and performs a clutch control based on transmission output shaft acceleration when determining a shift demand for a power-on down shift together with a speed control in a shift process.

In addition, the hybrid controller (HCU) 20 outputs a torque command for a speed control of a vehicle driving source based on a transmission input speed (=transmission input shaft rotation speed) and a synchronous speed in a power-on down shift process.

Further, the motor controller (MCU) 60 drives the motor 100 (motor drive control depending on command) depending on a motor torque command outputted from the hybrid controller (HCU) 20 so as to control a motor speed, and the engine controller (ECU) 30 drives the engine 80 (engine drive control depending on command) depending on an engine torque command outputted from the hybrid controller (HCU) 20 so as to control an engine speed.

Hereinafter, a shift control method according to the forms of the present disclosure will be described referring to drawings.

Figure 6:
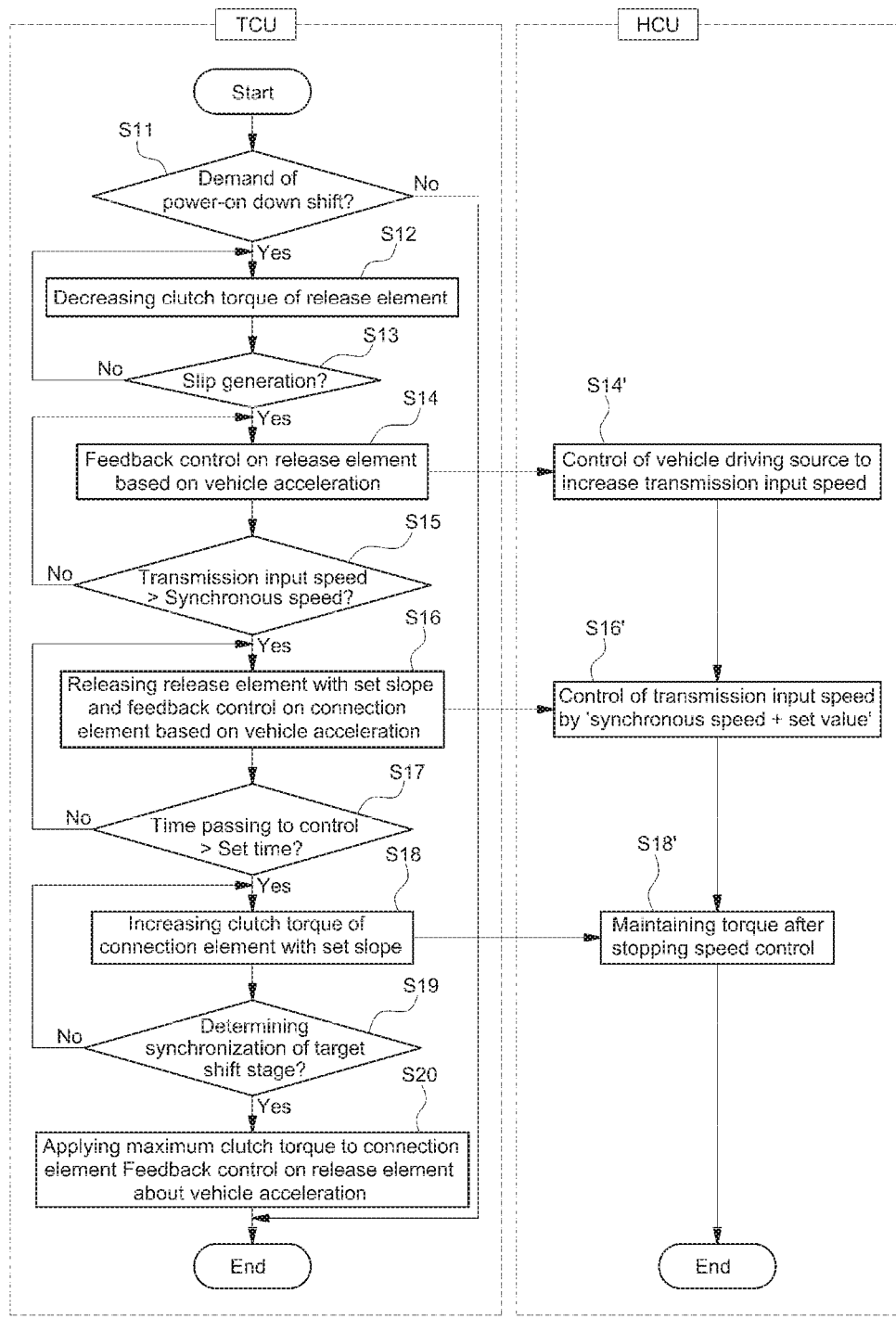
FIG. 6 is a flowchart showing a shift control method of a hybrid vehicle.
Figure 7:
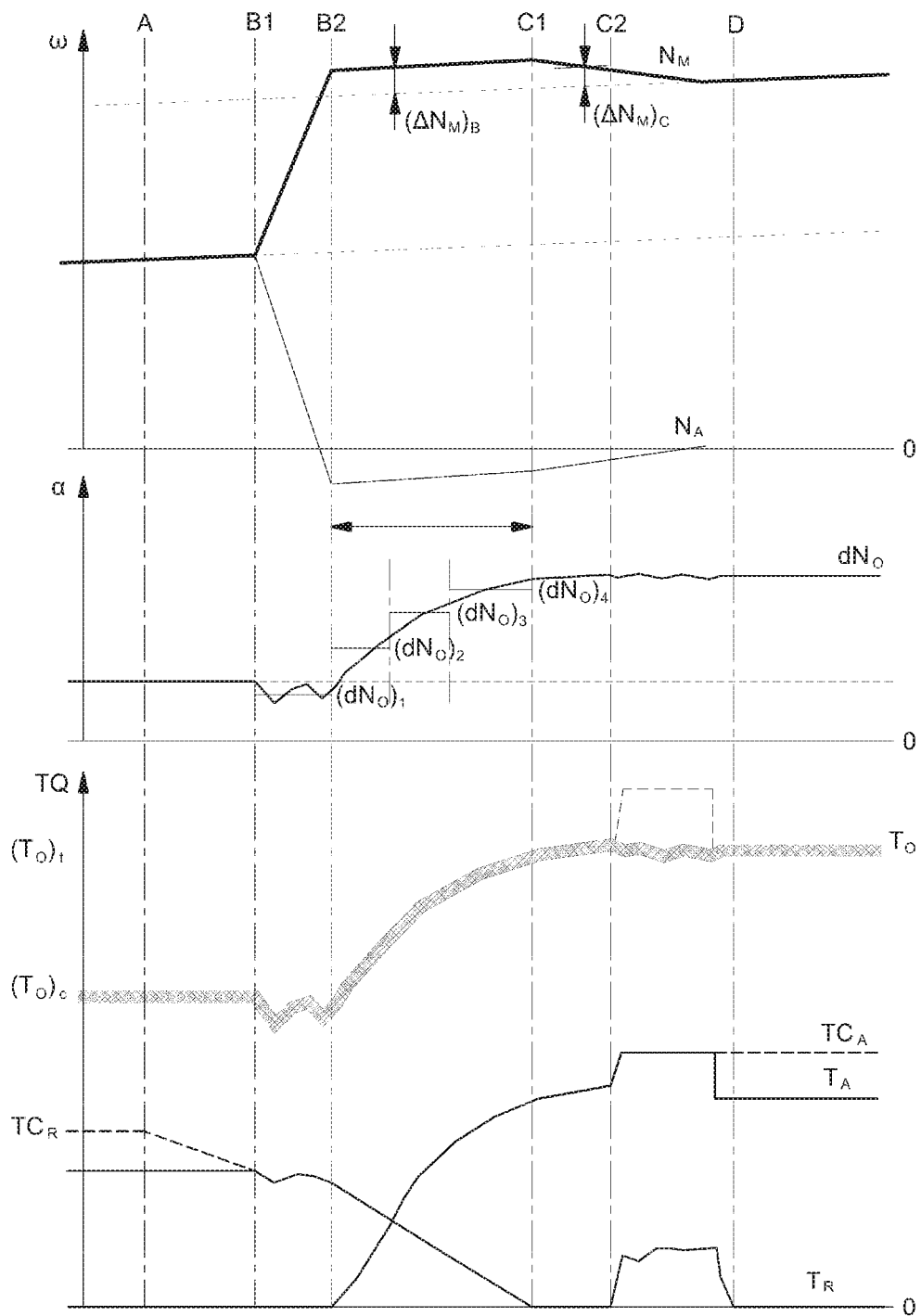
FIG. 7 is a view showing an example of a power-on down shift control of a hybrid vehicle.

FIG. 6 is a flowchart showing a shift control method of a hybrid vehicle according to one form of the present disclosure, and FIG. 7 shows an example of a power-on down shift control of a hybrid vehicle according to one form of the present disclosure.

Figure 8:
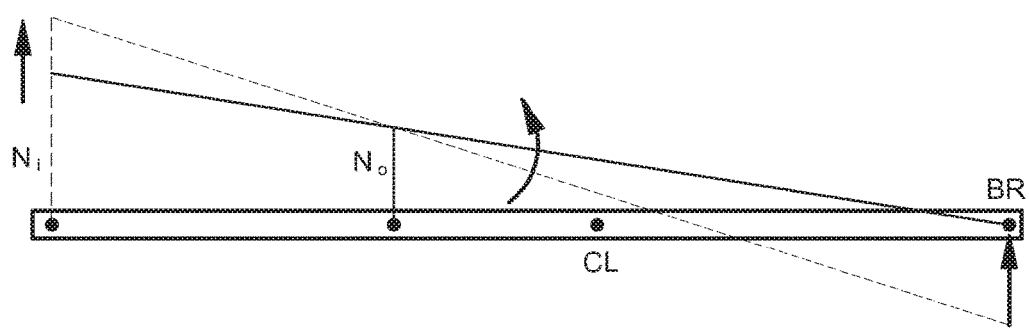
FIG. 8 is a view showing an example of speed change of a connection element in an active shift control method by a lever line illustration.

In addition, FIG. 8 shows an example of speed change of a connection element in an active shift control method according to one form of the present disclosure.

Hereinafter, variables such as a transmission input shaft rotation speed, a transmission output shaft rotation speed, and transmission output shaft rotation acceleration, or a transmission input shaft torque, an output shaft torque, and so on may be obtained by a detection element such as a sensor.

Firstly, the controller (TCU) detects a shift demand for a power-on down shift from current vehicle drive information detected by the driving information detection unit 10 (step S11), and this is not different from the above mentioned conventional art.

That is, if a driver operates an accelerator pedal, the controller determines whether to start a shift control for a power-on down shift depending on shift pattern from an accelerator pedal value detected by an accelerator pedal detection unit and a current drive vehicle speed detected by a vehicle speed detection unit.

As described above, if a power-on down shift is determined, a shift control is started at a time point A of FIG. 2, and a release control on a clutch, which is the release element in the transmission, is started by the controller (TCU).

At this time, the controller reduces a clutch torque ($TC_R$) of the release element in the transmission such that a clutch is released (step S12).

As described above, a clutch torque ($TC_R$) of the release element is decreased, and then in a state of in-gear, slip is generated when a clutch torque ($TC_R$) of the release element is to be smaller than a transfer torque ($T_R$) of the release element at a time point B1 of FIG. 7.

A speed change section is started from the time point B1, and the controller (TCU) determines whether slip of the release element in the transmission is generated (step S13), and it is determined that slip is generated if it is detected that a transmission input shaft rotation speed (=transmission input speed) ($N_M$) is increased by slip of the release element, thereby entering to the speed change section at the time point B1.

In this regard, it is set to determine generation of slip if the controller detects that a transmission input shaft rotation speed ($N_M$) is rapidly increased with a slope to be larger than a previous slope.

At this time, if slip of the release element is generated, the controller (TCU) performs feedback control on the release element in the transmission based on a transmission output shaft rotation acceleration ($dN_O$) (step S14), and simultaneously, a speed control on a vehicle driving source is performed such that a transmission input shaft rotation speed is increased by the controller (HCU) (step S14').

It is desirable that information of a transmission output shaft torque ($T_O$) is used in a clutch control for minimizing a reduction of vehicle acceleration ($a_{VEH}$) during the speed change section, but a feedback control of the release element is performed based on a transmission output shaft rotation acceleration ($dN_O$) having a proportional relation in a case of a system that direct monitoring is impossible.

This is because a vehicle wheel activity radius $r_{WHL}$, a wheel shaft rotation acceleration $\alpha_{WHL}$, a transmission output shaft rotational inertia moment $I_O$, a gear ratio $i_O$, and a vehicle load torque $T_R$ satisfy the following formulas.

$$a_{VEH} = r_{WHL} \times \alpha_{WHL},$$

$$\alpha_{WHL} = i_O \times dN_O,$$

$$T_O - T_R = I_O \times dN_O$$

$$\Delta T_O = I_O \times \Delta dN_O \text{ ($\Delta T_R$ during the shift is negligible as a slight value)}$$

In addition, if a transmission output shaft rotation acceleration $dN_O$ before slip generation is stored as an output shaft rotation acceleration $((dN_O)_c)$ of a current (before the shift) shift stage, a transmission output shaft rotation acceleration $((dN_O)_t)$ of a target shift stage may be calculated with the formulas below.

$$(T_O)_c = i_c \times T_i$$

$$(T_O)_t = i_t \times T_i$$

Therefore, $$(T_O)_t = (i_t/i_c) \times (T_O)_c$$

$$(dN_O)_t = (i_t/i_c) \times (dN_O)_c$$

Herein, $i_c$ represents a gear ratio of a current (before the shift) shift stage, $i_t$ represents a gear ratio of a target shift stage, $(T_O)_c$ represents a transmission output shaft torque before the shift, and $(T_O)_t$ represents a transmission output shaft torque of a target shift stage.

In addition, $T_O$ is determined by only transfer torque ($T_R$) of the release element from the time of slip generation, and the controller (TCU) sets an output shaft rotation acceleration target value $(dN_O)_1$ to $k_{B1} (dN_O)_c$ (herein, a predetermined constant value $k_{B1} < 1$) so as to minimize reduction of a vehicle acceleration and increase a transmission input shaft rotation speed and performs a feedback control on the release element.

At this time, the controller performs a speed control of a vehicle driving source, that is, speed control of the engine and the motor in an HEV mode and speed control of the motor in an EV mode such that a transmission input shaft rotation speed (=transmission input speed) ($N_M$) is increased irrespective of a demand torque (step S14').

In this regard, the controllers may be a hybrid controller (HCU), a motor controller (MCU), and an engine controller (ECU).

In addition, the motor controller (MCU) and the engine controller (ECU) respectively control the driving of the motor and the engine according to a torque command of the hybrid controller (HCU) so as to control a speed of each driving source.

Next, a vehicle acceleration increase section is started from a time point B2, and the controller (TCU) compares a transmission input shaft rotation speed (=transmission input speed) ($N_M$) with 'synchronous speed+$(\Delta N_M)_B$' (step S15), thereby entering the vehicle acceleration increase section at the time point B2 if transmission input shaft rotation speed (=transmission input speed) ($N_M$) is equal to or more than 'synchronous speed+$(\Delta N_M)_B$'.

At this time, the controller (TCU) performs a feedback control on the connection element in the transmission based on transmission output shaft rotation acceleration ($dN_O$) and decreases a clutch torque ($TC_R$) of the release element at a step S16.

In addition, the controller (TCU) gradually increases a transmission output shaft rotation acceleration target value $((dN_O)_2, (dN_O)_3, \ldots, (dN_O)_n)$ so as to increase a torque difference (a transmission output shaft torque difference, $(T_O)_t - (T_O)_c$) between shift stages to be a desired torque profile.

That is, in an example of FIG. 7, the time $T_{B2}$ of a vehicle acceleration increase section is divided with a plurality of time sections, and then the transmission output shaft rotation acceleration target value is set to $(dN_O)_c + k_{Bj}\{(dN_O)_t - (dN_O)_c\}$ in the each time section, and a feedback control on the connection element is performed.

Herein, $k_{Bj}$ (j is an index for dividing the time sections, j=1, 2, 3, ..., n), that is, $k_{B1}, k_{B2}, k_{B3}, \ldots, k_{Bn}$ are a constant value set in the each time section, and are preset to be a value smaller than 1 ($k_{B1}, k_{B2}, k_{B3}, \ldots, k_{Bn}<1$).

In addition, the plurality of sections is divided according to progress based on a time $t_{B2}$ predetermined by a torque profile.

Further, a clutch torque ($TC_R$) of the release element is controlled to be decreased with a constant slope during $t_{B2}$ to become lastly 0, and blend-over with the connection element is realized, and a feedback control is performed by using the connection element as a main control element.

This is because, in a lever line illustration as shown in FIG. 8, as a right end of a lever is positioned to be lower than a brake (BR) which is the connection element when the time point B2 is started, and if a clutch torque ($TC_A$) of the connection element is increased, a rotation speed ($N_A$) of the connection element and a division torque (i.e., transfer torque of connection element, $T_A$) are increased and a clutch torque ($TC_R$) of the release element is also acted toward a direction in which both two control elements increase a vehicle acceleration.

In addition, in the vehicle acceleration increase section after the time point B2, the controller performs a speed control of a vehicle driving source such that a transmission input shaft rotation speed (=transmission input speed) ($N_M$) follows 'synchronous speed+$(\Delta N_M)_B$' at a step S16'.

At this time, the controller performs a speed control of the engine and the motor in an HEV mode and a speed control of the motor in an EV mode such that a transmission input shaft rotation speed (=transmission input speed) ($N_M$) follows 'synchronous speed+$(\Delta N_M)_B$'.

Herein, $(\Delta N_M)_B$ is a set value which is predetermined, and the motor controller (MCU) and the engine controller (ECU) respectively control the driving of the motor and the engine according to a torque command of the hybrid controller (HCU) so as to control a speed of each driving source.

In addition, when a clutch torque ($TC_A$) of the combine element only acts as a clutch torque ($TC_R$) of the release element is to be 0 as the predetermined time $t_{B2}$ passes, a clutch torque ($TC_A$) of the connection element becomes the equivalent level to a transfer torque (division torque) ($T_A$) of the combine element of a target shift stage by control based on a transmission output shaft rotation acceleration ($dN_O$).

In other words, a transmission input shaft torque and a clutch conversion torque of the connection element acting as a reaction force thereto are to be equilibrium by the above mentioned speed control, and are collected to the equivalent level to a input shaft torque upon starting the shift when the predetermined time $t_{B2}$ passes, and thus a reduction of a torque is not required if only the torque is maintained.

Next, a synchronization preparation section is started at a time point C1, and the controller (TCU) determines whether the predetermined time $t_{B2}$ passes from the time point B2 (step S17), thereby entering the synchronization preparation section at the time point C1 when the predetermined time passes.

In the synchronization preparation section, a clutch torque ($TC_A$) of the connection element is increased with a constant slope until synchronization determined by the controller (TCU) (step S18), and simultaneously, the controller (HCU) stops a speed control and maintains a transmission input shaft torque when entering the synchronization preparation section of the time point C1 (step S18').

Next, the controller (TCU) determines whether synchronization of a target shift stage is realized (step S20), and then when the synchronization is determined, a synchronization section is entered at the time point C2.

For instance, the controller may determine that synchronization is realized when a condition of '$|N_M-$synchronous speed$|<(\Delta N_M)_c$' is satisfied for a set time and then enter the synchronization section.

Herein, $(\Delta N_M)_B$ is a set value which is predetermined.

In the synchronization section, the controller (TCU) supplies a maximum clutch torque to the connection element and performs a feedback control on the release element based on a transmission output shaft rotation acceleration ($dN_O$) (step S20).

In the synchronization section, a maximum clutch torque is applied to the connection element for certain synchronization, and a transfer torque ($T_A$) and a clutch torque ($TC_A$) of the connection element are same before physical synchronization but a step difference is generated with respect to a transfer torque when completing the shift after synchronization.

In this regard, if there is no control on the release element in the synchronization section, a step difference as illustrated by a dotted line may be generated from a transmission output shaft torque ($(T_O)_t$) of a target shift stage.

Therefore, in the release element, a torque step difference is offset by performing a feedback control such that a transmission output shaft rotation acceleration ($(dN_O)_t$) when completing the shift to a target shift stage, that is, a transmission output shaft rotation acceleration ($(dN_O)_t$) of the target shift stage is maintained.

In addition, a clutch torque ($TC_R$) of the release element which is controlled by a feedback control is collected to 0 if a transfer torque ($T_A$) of the connection element is to be small after physical synchronization.

In addition, in the synchronization section, the controller (HCU) controls an output torque of a vehicle driving source such that a transmission input shaft torque ($T_i$) transferred from a vehicle driving source is constantly maintained.

Next, the time point D is the time when the shift is completed, and the controller determines that the shift is completed when a condition of 'clutch torque ($TC_A$) of combine element=maximum value (MAX. value) and clutch torque ($TC_R$) of release element=0' is satisfied during a set time.

In the time point D when the shift is completed, the controller (TCU) ends a clutch control of the transmission, and then a drive control of a vehicle driving source for satisfying a driver demand torque, that is, an output torque control on a vehicle driving source is performed by the controller (HCU), and thus conversion to a transmission input shaft torque ($T_i$) satisfying a driver demand torque is realized.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A shift control method for a hybrid electric vehicle comprising the steps of:
   step a) of when a shift demand for a power-on down shift is detected, a controller starting a release control of a clutch and determining whether slip of a release element is generated from a rotation speed of a transmission input shaft, wherein the clutch is the release element in a transmission;
   step b) of when generation of the slip of the release element is determined, the controller starting a feedback control of the release element in the transmission based on information, and simultaneously, controlling a speed of a vehicle driving source to increase a speed of the transmission input shaft, wherein the information is based on a torque of a transmission output shaft or a rotation acceleration of the transmission output shaft;
   step c) of when the speed of the transmission input shaft reaches 'synchronous speed+predetermined value', the controller:
      controlling the speed of the vehicle driving source, wherein the speed of the transmission input shaft follows 'synchronous speed+predetermined value'; and
      simultaneously increasing a rotation acceleration of the transmission output shaft, wherein the controller performs a feedback control of a connection element in the transmission based on the rotation acceleration of the transmission output shaft;
   step d) of preparing a synchronization, wherein a transmission input torque from the vehicle driving source is maintained and the clutch torque of the connection element in the transmission is increased; and
   step e) of completing a shift after determining the synchronization.

2. The shift control method of claim 1, wherein in step b), the controller performs the feedback control of the release element, wherein the rotation acceleration of the transmission output shaft becomes a value of 'a rotation acceleration of the transmission output shaft before shifting and before slip generation×$k_{B1}$ (herein, $k_{B1}$<1)'.

3. The shift control method of claim 1, wherein the controller calculates the rotation acceleration of the transmission output shaft of a target shift stage based on a gear ratio of a shift stage before shifting, a gear ratio of the target shift stage, and a rotation acceleration of the transmission output shaft before shifting and before slip generation; and wherein in step c), the controller performs the feedback control of the connection element in the transmission, wherein the rotation acceleration of the transmission output shaft is increased to the rotation acceleration of the transmission output shaft of the target shift stage by increasing the clutch torque of the connection element.

4. The shift control method of claim 3, wherein the rotation acceleration of the transmission output shaft of the target shift stage is calculated based on formula:

$$(dN_0)_t=(i_c/i_t)\times(dN_0)_c,$$

wherein, $(dN_0)_t$ is the rotation acceleration of the transmission output shaft of the target shift stage, $i_c$ is the gear ratio of the shift stage before shifting, $i_t$ is the gear ratio of the target shift stage, and $(dN_0)_c$ is the rotation acceleration of the transmission output shaft before shifting and before slip generation.

5. The shift control method of claim 3, wherein in step c), the controller:
   divides a predetermined time $T_{B2}$ into a plurality of time sections, wherein the predetermined time $T_{B2}$ is the time that a speed of the transmission input shaft reaches 'synchronous speed+predetermined value';
   sets a target value of the rotation acceleration of the transmission output shaft in each time section of the plurality of the time sections; and
   performs the feedback control of the connection element in the transmission, wherein the rotation acceleration of the transmission output shaft is increased to a corresponding target value in each time section of the plurality of the time sections.

6. The shift control method of claim 5, wherein the target value of the rotation acceleration of the transmission output shaft, is set to be gradually increased, wherein the target value of the rotation acceleration of the transmission output shaft is set in each time section of the plurality of the time sections.

7. The shift control method of claim 6, wherein the target value of the rotation acceleration of the transmission output shaft is calculated based on the formula:

$$(dN_0)_c+k_{B1}\{(dN_0)_t-(dN_0)_c\},$$

wherein, $(dN_0)_t$ is the rotation acceleration of the transmission output shaft of a target shift stage, $(dN_0)_c$ is the rotation acceleration of the transmission output shaft before shifting and before slip generation, and $k_{Bj}$ (j is an index for dividing the time sections, j=1, 2, 3, ..., n.

8. The shift control method of claim 5, wherein step d) starts as the predetermined time $T_{B2}$ passes after entering into step c).

9. The shift control method of claim 1, wherein the controller performs the feedback control of the release element such that a clutch torque of the release element is decreased at a constant slope, wherein the constant slope is maintained as the clutch torque of the release element become 0 during step c) until entering into step d).

10. The shift control method of claim 1, wherein in step e), the controller applies a maximum clutch torque to the connection element in the transmission and performs the feedback control of the release element, wherein the rotation acceleration of the transmission output shaft of the target shift stage is maintained based on the rotation acceleration of the transmission output shaft.

11. The shift control method of claim 10, wherein the rotation acceleration of the transmission output shaft of the target shift stage is calculated based on the formula:

$$(dN_0)_t = (i_t/i_c) \times (dN_0)_c,$$

wherein, $(dN_0)_t$ is the rotation acceleration of the transmission output shaft of the target shift stage, $i_c$ is the gear ratio of the shift stage before shifting, $i_t$ is the gear ratio of the target shift stage, and $(dN_0)_c$ is the rotation acceleration of the transmission output shaft before shifting and before slip generation.

* * * * *